United States Patent
Bruhnke et al.

(10) Patent No.: US 6,510,517 B1
(45) Date of Patent: Jan. 21, 2003

(54) METHOD OF CRYPTOLOGICAL AUTHENTIFICATION IN A SCANNING IDENTIFICATION SYSTEM

(75) Inventors: Michael Bruhnke, München (DE); Ferdinand Friedrich, Heroldsberg (DE)

(73) Assignee: TEMIC Semiconductor GmbH, Heilbronn (DE)

( * ) Notice: Subject to any disclaimer, the term of this patent is extended or adjusted under 35 U.S.C. 154(b) by 0 days.

(21) Appl. No.: 09/254,865

(22) PCT Filed: Sep. 13, 1997

(86) PCT No.: PCT/EP97/05012

§ 371 (c)(1),
(2), (4) Date: Jun. 4, 1999

(87) PCT Pub. No.: WO98/11689

PCT Pub. Date: Mar. 19, 1998

(30) Foreign Application Priority Data

Sep. 13, 1996 (DE) .......................... 196 37 319

(51) Int. Cl.⁷ .................. H04L 9/00; H04N 7/167
(52) U.S. Cl. .................. 713/168; 713/161; 713/169; 713/170; 380/229; 380/232; 380/277; 705/59
(58) Field of Search .................. 713/168, 155, 713/161, 169, 170; 370/277, 229, 232, 268, 289, 43, 44, 45; 705/59; 714/750

(56) References Cited

U.S. PATENT DOCUMENTS

| 3,605,091 A | * 9/1971 | Shih ........................... 714/750 |
| 5,224,164 A | * 6/1993 | Elsner ......................... 380/44 |
| 5,282,249 A | * 1/1994 | Cohen et al. ............... 380/229 |
| 5,309,516 A | * 5/1994 | Takaragi et al. ............. 380/45 |
| 5,313,521 A | * 5/1994 | Torii et al. .................. 380/281 |
| 5,365,589 A | * 11/1994 | Gutowitz ..................... 380/43 |
| 5,473,689 A | * 12/1995 | Eberhard ..................... 713/169 |
| 5,636,277 A | * 6/1997 | Nagahama ................... 705/59 |
| 6,038,321 A | * 3/2000 | Torigai et al. .............. 380/268 |

FOREIGN PATENT DOCUMENTS

| DE | 4317380 | 8/1994 |
| EP | 0683293 | 11/1995 |
| EP | 0723896 | 7/1996 |

* cited by examiner

Primary Examiner—Thomas R. Peeso
Assistant Examiner—Kambiz Zand
(74) Attorney, Agent, or Firm—Robert Kinberg; Venable, LLP

(57) ABSTRACT

The method of cryptological authentification in a scanning identification system comprising a base station, which supplies energy via the alternating field to a transponder connected to the object to be identified, includes the following method steps. For essentially the entire communication between the base station and the transponder, the base station generates an inquiry signal. Upon receiving the inquiry signal transmitted by the base station, the transponder responds with an identification number stored in its memory. The base station then encodes a first bit sequence it has generated by using a key bit sequence that is allocated to the identification number of the transponder, and transmits the second bit sequence obtained in this manner to the transponder. When the second bit sequence is received, the transponder generates a checking bit sequence from the second bit sequence, and, following the complete reception of the second bit sequence, transmits this checking bit sequence to the base station. The checking bit sequence serves to verify the correct reception of the second bit sequence. For cryptographic authentication, the transponder encodes the first bit sequence reconstructed from the second bit sequence using the key bit sequence allocated to the transponder, and transmits the third bit sequence obtained in this manner to the base station. While the transponder is still encoding the second bit sequence to form the third bit sequence, the base station uses the checking bit sequence to verify whether an error has occurred in the transmission of the second bit sequence, and may abort the ongoing encoding in the transponder. This can abort the ongoing authentication, because a valid result cannot be anticipated. Thus, time is gained at the start of a new running of the authentification method.

4 Claims, 4 Drawing Sheets

METHOD OF CRYPTOLOGICAL AUTHENTIFICATION IN A SCANNING IDENTIFICATION SYSTEM

The invention relates to a method of cryptological authentication in a scanning identification system.

In the last few years, a system for the identification of persons, animals and objects that has proven effective involves the supply of a transponder, which is connected to the object to be identified, with energy by a (stationary or portable) reading device, also referred to as a reader or base station, via an alternating field, whereupon the transponder responds by emitting the data it stores. Because of the frequency range used, the system is referred to as a radio-frequency identification system, or RFID for short.

An RFID transponder generally comprises an antenna coil and an integrated circuit containing all of the necessary electronic circuit blocks, such as those needed for voltage supply, timing generation, timing control and storing the data required for the identification. The capacity switched in parallel to the antenna coil is likewise often a component of the integrated circuit. It can, however, also be formed by a discrete component.

The RFID reader comprises a resonating circuit having a transmitting coil and a capacity that is actuated by a driver stage with a signal generally having a fixed frequency (e.g. 125 kHz). The reader further includes electronic circuit blocks for recognizing data emitted by the transponder through absorption modulation, and for transmitting data and commands, e.g. through field modulation, to the transponder.

During the data or energy transfer, the reader and the transponder form a loosely-coupled transformer. The energy transfer is therefore relatively low.

The attainable range for the contactless transfer of energy and data is influenced by the following marginal conditions:

the transmitting energy (limited by legal specifications);

the coil dimensions;

the disturbance level of the environment;

matching resonance frequencies;

the modulation amplitude;

the voltage loss via the rectifier; and the transfer methods used.

For example, in the use of an anti-theft mechanism, extremely-unfavorable transfer conditions arise because of the small transmitting coil arranged around the ignition/steering-column lock. Hence, it is advisable to optimize the system for minimal losses. Decisive factors for this are:

an identical resonance frequency of the base station and the transponder;

transfer protocols that are optimized with respect to time;

minimal losses during the energy transfer;

maximal modulation amplitude during the transfer of data to the base station (read); and optimized data transfer to the transponder (send).

EP 0 683 293 A1 discloses an authentification method in a scanning identification system, in which a challenge-and-response protocol is used for cryptologicial authentification.

When a motor vehicle is started, the driver notices a time delay of more than 150 ms from the turning of the ignition key until the engine starts. consequently, the entire transfer protocol must have run during this very short time period. Several points must be kept in mind here. On the one hand, a one-time data transfer should produce the correct result; on the other hand, additional functions such as authentication by means of an algorithm should be performed in the shortest-possible time.

It is the object of the invention to provide a method of cryptological authentification in a scanning identification system that runs in the shortest-possible time.

This object is accomplished by a method of cryptological authentification in a scanning identification system having the features of claims 1 and 4. The advantageous embodiment of the invention ensues from the features listed in the dependent claims.

The method of cryptological authentification in a scanning identification system comprising a base station, which supplies energy via the alternating field to a transponder connected to the object to be identified, includes the following method steps.

For essentially the entire communication between the base station and the transponder, the base station generates an inquiry signal. Upon receiving the inquiry signal transmitted by the base station, the transponder responds with an identification number stored in its memory. The base station then encodes a first bit sequence it has generated by using a key bit sequence that is allocated to the identification number of the transponder, and transmits the second bit sequence obtained in this manner to the transponder.

When the second bit sequence is received, the transponder generates a checking bit sequence from the second bit sequence, and, following the complete reception of the second bit sequence, transmits this checking bit sequence to the base station. The checking bit sequence serves to verify the correct reception of the second bit sequence. For cryptographic authentification, the transponder encodes the first bit sequence reconstructed from the second bit sequence using the key bit sequence allocated to the transponder, and transmits the third bit sequence obtained in this manner to the base station.

While the transponder is still encoding the second bit sequence to form the third bit sequence, the base station uses the checking bit sequence to verify whether an error has occurred in the transmission of the second bit sequence, and may abort the ongoing encoding in the transponder. This can abort the ongoing authentification, because a valid result cannot be anticipated. Thus, time is gained at the start of a new running of the authentification method.

In the other case, the base station verifies the validity of the received third bit sequence.

The authentification time is further reduced in that the transponder halves the length of the third bit sequence prior to transmitting it to the base station.

In one embodiment of the method, at the beginning of the method, the base station uses a key bit sequence associated with itself and the transponder to immediately encode a first bit sequence that it has generated, and immediately transmits the second bit sequence obtained in this manner to the transponder instead of awaiting the reception of the transponder identification number. This further reduces the authentification time.

The method of the invention is described below by way of an example, with reference to the figures. For a more detailed explanation of the principle of a cryptological authentification, a description of the TIME (TEMIC Immobilizer Encryption) method developed and optimized by TEMIC especially for high security requirements, such as anti-theft mechanisms, is given; this method is characterized by the following features:

fast, reliable authentification (<100 ms);

a high-security algorithm optimized to the respective application; and customer-specific generation of unique keys.

Figure 1:
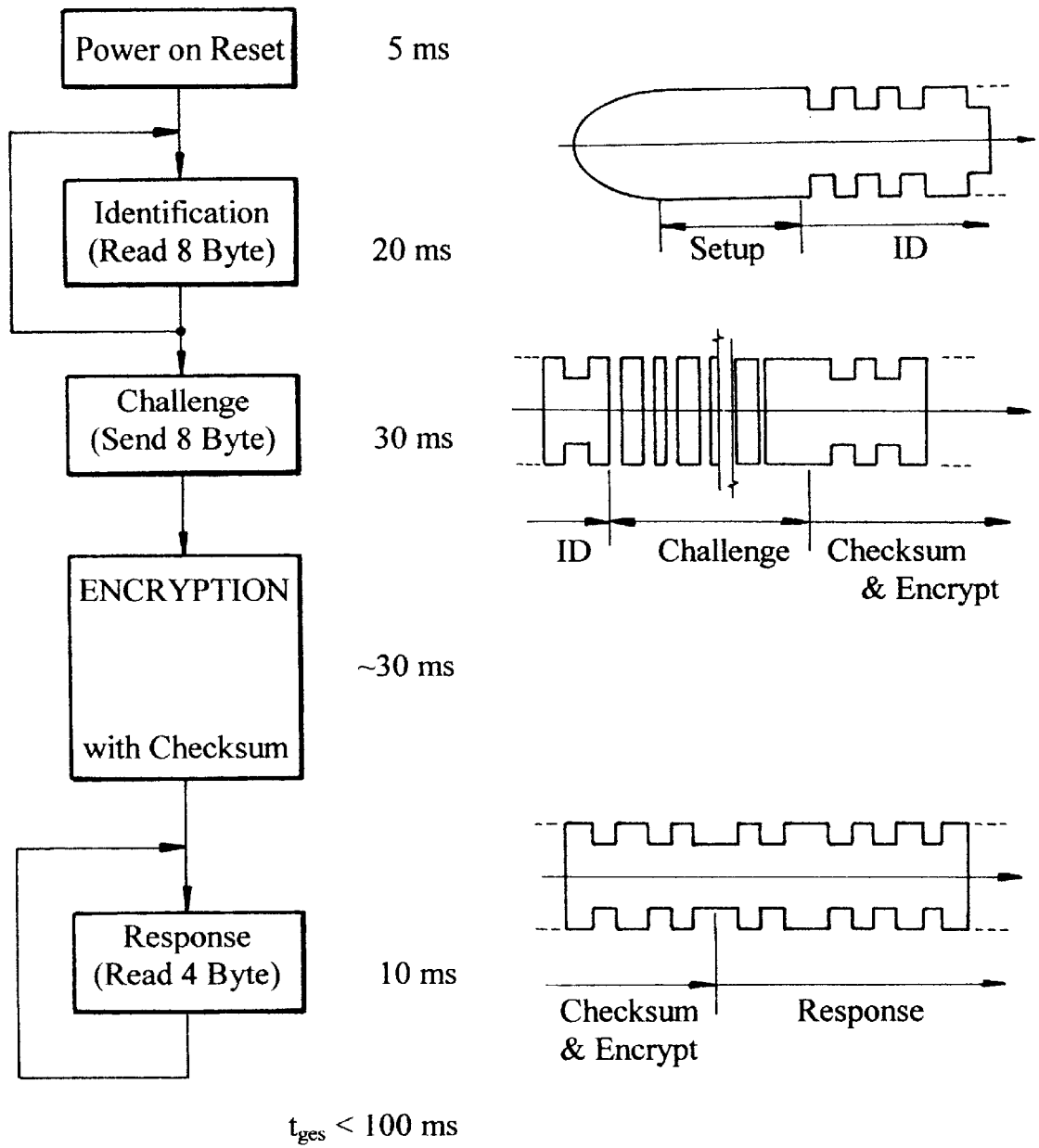
FIG. 1 a flow chart of the method of cryptological authentification in a scanning identification system on the transponder side.

Thus, a high degree of reliability is attained, both in the data transfer and the actual encoding, in connection with an extremely-short authentification time. FIG. 1 shows the course of the authentification optimized by TEMIC for the minimum time. The notable features here are, first, the short time required for calculating the algorithm (encryption time 30 ms), second, the shortening of the response from eight to four bytes with a special method and, third, the option of aborting the process of the recognition of an error.

In the initialization of the RFID system, the transponder and the base station receive a common, specially-generated, 120-bit-long cryptological key, the so-called crypto key, which specifies the function of the cryptographic algorithm. This key is unique in the entire system. No other RFID system, that is, no further base station and no further transponder, possesses this key.

During operation, following the synchronization (setup) with the base station, the transponder transmits an unambiguously-specified bit sequence (string) of a fixed length (depending on the application, 64 bits, for example), called the ID code or ID for short, to the base station.

This ID is usually used for key identification. This is necessary when different transponders (having different cryptological keys) are supposed to cooperate with one base station.

Figure 2:
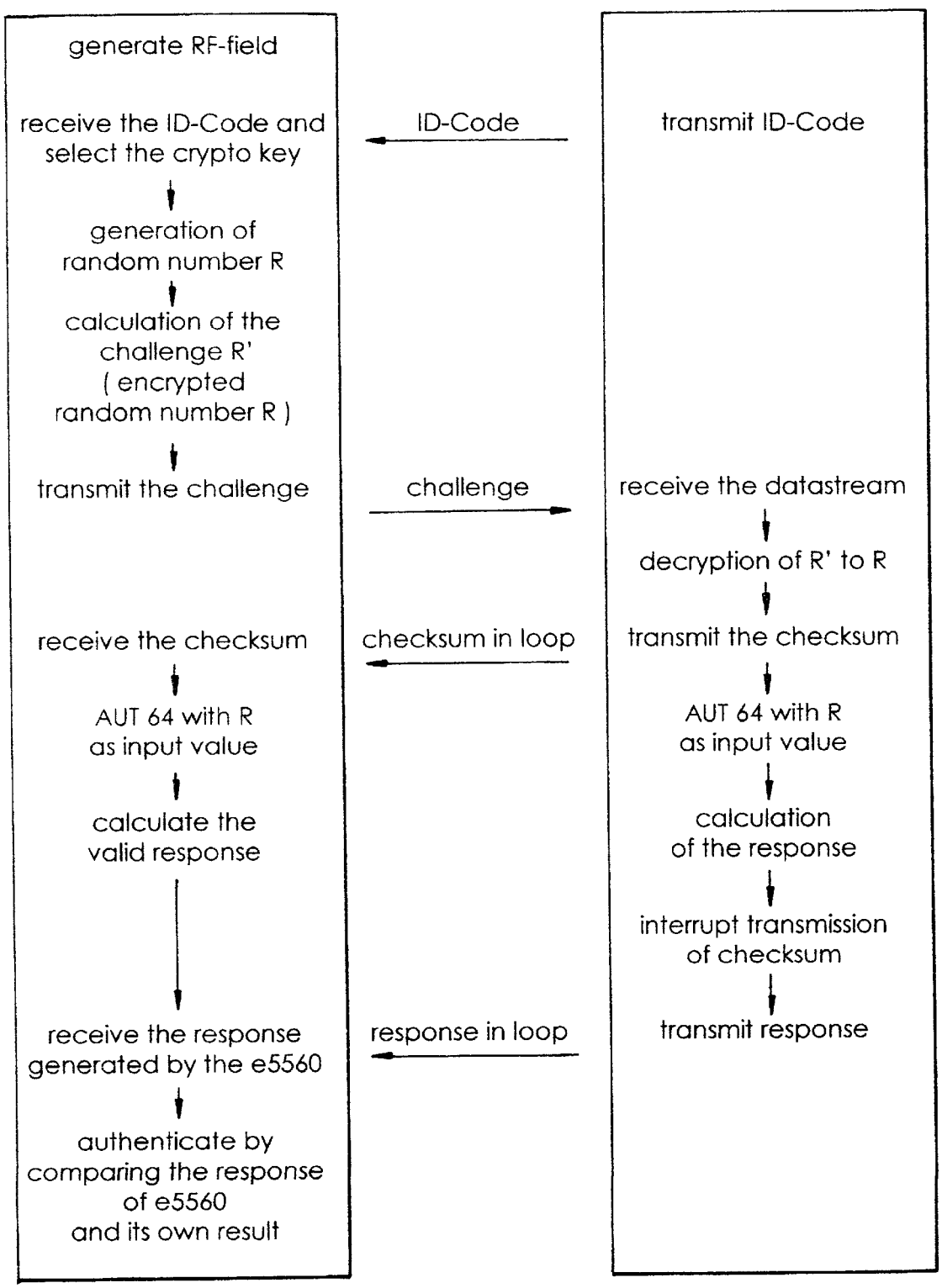
FIG. 2 the course of the method in an anti-theft mechanism for a motor vehicle.

The used authentification protocol is a challenge-and-response protocol, as shown in FIG. 2, having the feature that "Known Plaintext" and "Chosen Plaintext" attacks are unsuccessful.

The base station generates a first bit sequence in the form of a 64-bit chance number Z, and encodes this number by means of a 32-bit partial key generated from the cryptological key. The second bit sequence obtained in the form of a 64-bit chance result—the so-called challenge—is transmitted to the transponder. Only one transponder possessing the same partial key is capable of reconstructing the chance value. An observer of the protocol is therefore unable to ascertain the chance number Z. The transponder and the base station encode the challenge by means of the 120-bit cryptological key with the use of a specially-developed algorithm AUT 64. A third bit sequence in the form of a 32-bit character sequence is generated from the 64-bit encoding result. The transponder transmits this character sequence—the so-called response—to the base station. If the transmitted response and the generated string match, the base station accepts the authenticity of the transponder.

The used algorithm AUT 64 is a byte-oriented block cipher that generates output strings from 64 bits with the use of a 120-bit cryptological key. A 64-bit input string (here the chance number Z) is transferred into a 64-bit output string (here the encoding result) through encoding in 24 rounds. A different key generated from the cryptological key is used in each round. This procedure attains the high degree of security. Statistical analyses offer impressive corroboration of this fact. This is essentially based on a non-linear encoding that is selected differently (key-controlled) in each round.

Key generation: For generating the 120-bit cryptological key, TEMIC provides a program that utilizes, among other things, the Data-Encryption Standard (DES) as a chance generator. This ensures that the user alone has knowledge of the cryptological key.

The 120-bit cryptological key used for the AUT 64 comprises the components of family key (24 bits), user key (64 bits) and random key (32 bits). The user key is generated by the manufacturer by means of a serial key.

Random key: The random key is generated by means of the DES. The associated 56-bit DES key and the DES input are determined by the user, so TEMIC possesses no information about the DES output and thus the generated random key.

Family key: The respective keys are generated by means of a special program, which particularly guarantees that different users obtain different groups of family keys of 24-bit length. Each user is allocated 12 bits, and can select from a range of 16 numbers. This is the only knowledge that TEMIC possesses about the key that will be used later.

User key: A one-time, 64-bit chance number is generated by means of a special method, i.e., each user key is only generated once. A repeat will only occur after $20.9 * 10^{12}$ user keys have been generated.

Shortening of the transfer protocol through the following:

It is not necessary to wait for the transmission of the entire ID code (identification); the challenge could already be transmitted after the power-on-reset. →20 ms are saved.

A check sum is transmitted to the base station during the calculation of the algorithm (encryption, encoding of the challenge). It is thereby checked whether the challenge was transmitted correctly. Should this not be correct, the encryption can be aborted immediately by the transmission of a gap, and a new challenge is transmitted. Therefore, it is not necessary to wait for the inevitably-erroneous and thus useless response.

The result of the encryption, like the input (the challenge), comprises 8 bytes. These 64 bits are linked, for example by an XOR function, so only 4 bytes need be transferred as the result (response) back to the base station. →The time is halved (in this example, from 20 to 10 ms).

High-security algorithm:

The chance number, that is, the input for the AUT 64 algorithm, is not transferred directly, but first encoded (result=the challenge). →No chosen plaintext attacks are possible.

The algorithm AUT 64 is run 24 times and varied in each round; in other words, the non-linear encoding is selected to be different in each round (key-controlled). →The algorithm is difficult to "break."

Key generation:

A partial key—the user key—is generated by means of a special method so as to be unique. A repeat will only occur after $20.9 * 10^{12}$ user keys have been generated.

Only the user can influence the generation of the random key; neither TEMIC nor a third party has information about the random key.

For the family key, TEMIC allocates each user a partial range. This user, for example a motor-vehicle manufacturer, can select from a range of 16 numbers and thus assign each motor-vehicle series (e.g. each VW Golf) a specific family-key partial key. →Each user receives a specific partial-key range, and the algorithm that accesses the key varies (e.g. VW and Opel have different keys).

The data transfer in the described method can be divided into three modes:

Read mode=data transfer from the transponder to the base station;

Send mode=data transfer from the base station to the transponder; and

Write mode=data transfer from the base station to the transponder with subsequent programming.

Different options are used in the individual modes to assure the data integrity, i.e., a manipulation-free and therefore unchanged data transfer.

In the read mode, data (ID code) are read out of the EEPROM memory of the transponder and transmitted to the base station. The first eight bits represent a customer-specific header that is programmed by TEMIC and secured against manipulation. The other bits can be freely programmed by the customer, and normally contain a continuous number, including the check sum, so an erroneous code transfer can be recognized.

Advantage: The header and check sum are checked.

The send mode is used in the transfer of the starting value (challenge) for the authentification. The transponder verifies the correct number of transferred bits and the number of field clocks between the field gaps. Then it transmits a check sum formed from the number of transmitted "ones" to the base station (FIG. 5) for verifying a correct transfer. If the check sum is incorrect, it is possible to abort and re-start the authentification process.

Advantage: the bit number and number of clocks between the field gaps are checked, as is the transmission of the check sum.

Figure 3:
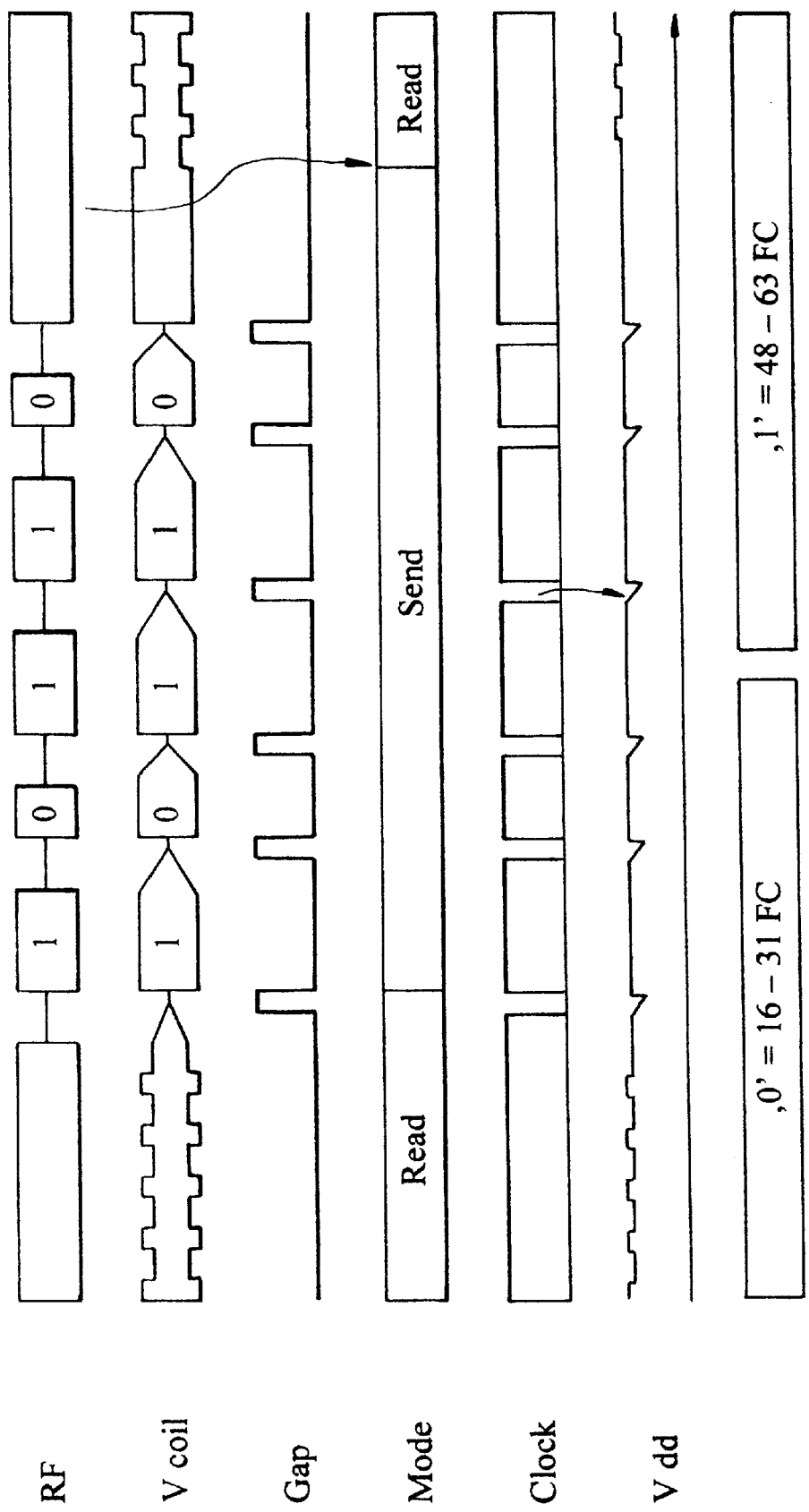
FIG. 3 different signal courses in the communication between the base station and the transponder.

The TEMIC writing method is based on the ON/OFF keying of the RF field generated by the reader. The information is contained in the number of field clocks between two field gaps (FIG. 3). The transmitted bits are recognized through decoding of the counter state attained between two pauses. It is also possible to transmit control signals in addition to the data information. To this end, further counter states are defined. The transition from the read mode to the send mode is initiated by a field gap, whereupon the chip card is switched to "send mode" and receives the subsequent data. The data transfer is checked for validity and the number of data bits. The send mode is exited when no pause is recognized after 64 field clocks at the latest.

Figure 4:
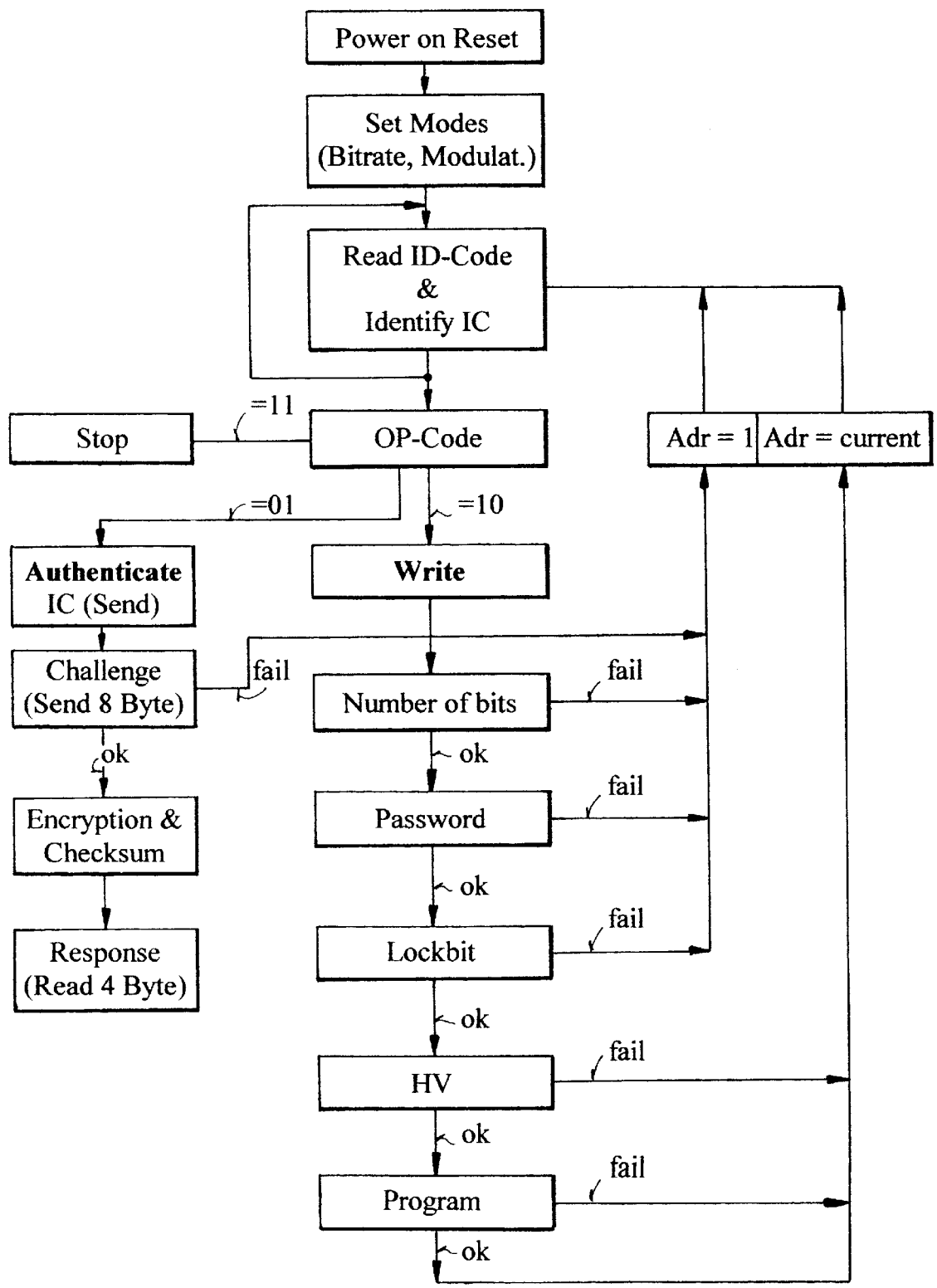
FIG. 4 a detailed flow chart of an RFID system having cryptological authentification.

In the write mode, first the data are transferred from the base station to the transponder and subsequently programmed into the EEPROM. As in the send mode, it is checked whether the data bits have been transferred correctly. If the memory region to be described is to be secured against manipulation through the setting of the corresponding lock bit, this is registered by the IDIC, and programming is prevented (FIG. 4). If all of the described logical verifications are positive, the high programming voltage of about 16 V required for programming is generated internally and measured analogously. This verification is also effected during the entire programming process. In the event of an error, the IDIC immediately aborts the programming and goes into read mode, transferring the ID code. This particular behavior is registered by the base station. If all goes correctly, the block that has just been programmed is transferred back to the base station for verification.

Advantage: Verifications are effected before programming.

The transfer of data must be correct, i.e., the number of transferred bits and the number of clocks between the field gaps must match.

Password protection cannot be implemented.

The lock bit cannot be set.

The high voltage must be sufficient (about 16 V for programming the EEPROM). This is checked before and during programming.

In the event of an error, the IC [sic] goes immediately, that is, earlier, into read mode and transfers data. This can be recognized by the base station.

Numerous mechanisms are implemented for protecting the stored data:

lock function;

password protection; and

UV protection.

Different regions of the memory can be separately protected against manipulation through the setting of lock bits. This lock function cannot be canceled.

If the password protection is activated, certain data can only be programmed into the memory or read out of the memory after the correct password has been transmitted. For example, a password that is known only to the respective customer can be programmed before the transponder is delivered, so no unauthorized user can access the memory.

If an intruder attempts to circumvent the password protection or the lock function by erasing the EEPROM, e.g. through UV irradiation, the UV protection becomes active. This protection prevents the reprogramming of a memory that has been completely erased.

What is claimed is:

1. A method of cryptological authentification in a scanning identification system having a base station, which supplies energy via the alternating field to a transponder connected to the object to be identified, the method comprising the following steps:

the base station generates an inquiry signal;

upon receiving the inquiry signal transmitted by the base station, the transponder responds with an identification number stored in its memory;

the base station then encodes a first bit sequence it has generated by using a key bit sequence that is allocated to the identification number of the transponder, and transmits the second bit sequence obtained in this manner to the transponder;

when the second bit sequence is received, the transponder generates a checking bit sequence from the second bit sequence, and, following the complete reception of the second bit sequence, transmits this checking bit sequence to the base station;

the transponder reconstructs the first bit sequence from the second bit sequence and encodes it using the key bit sequence allocated to the transponder, and transmits the third bit sequence obtained in this manner to the base station;

while the transponder is still encoding the second bit sequence to form the third bit sequence, the base station uses the checking bit sequence to verify whether an error has occurred in the transmission of the second bit sequence, and may abort the ongoing encoding in the transponder; and the base station verifies the validity of the received third bit sequence.

2. The method of cryptological authentification according to claim 1, characterized in that the transponder halves the length of the third bit sequence prior to transmitting it to the base station.

3. The method of cryptological authentification according to claim 1, characterized in that, at the start of the method, the base station immediately encodes a first bit sequence it has generated, using a key bit sequence allocated to itself and the transponder, and transmits the second bit sequence obtained in this manner to the transponder instead of waiting to receive the identification number of the transponder.

4. The method of cryptological authentification according to claim 2, characterized in that, at the start of the method, the base station immediately encodes a first bit sequence it has generated, using a key bit sequence allocated to itself and the transponder, and transmits the second bit sequence obtained in this manner to the transponder instead of waiting to receive the identification number of the transponder.

* * * * *